(12) United States Patent
Cummings et al.

(10) Patent No.: US 9,009,018 B2
(45) Date of Patent: Apr. 14, 2015

(54) ENABLING REUSE OF UNIT-SPECIFIC SIMULATION IRRITATION IN MULTIPLE ENVIRONMENTS

(71) Applicant: International Business Machines Corporation, Armonk, NY (US)

(72) Inventors: David W. Cummings, Round Rock, TX (US); Jonathan R. Jackson, Austin, TX (US); James A. McClurg, Austin, TX (US); Nathan A. Murati, Cedar Park, TX (US)

(73) Assignee: International Business Machines Corporation, Armonk, NY (US)

(*) Notice: Subject to any disclaimer, the term of this patent is extended or adjusted under 35 U.S.C. 154(b) by 361 days.

(21) Appl. No.: 13/652,111

(22) Filed: Oct. 15, 2012

(65) Prior Publication Data

US 2014/0107994 A1 Apr. 17, 2014

(51) Int. Cl.
*G06F 17/50* (2006.01)
(52) U.S. Cl.
CPC .................. *G06F 17/5022* (2013.01)
(58) Field of Classification Search
CPC ........... G06F 17/50; G06F 9/44; G06F 9/455; G06F 17/5022
USPC .......... 703/13, 14; 717/165; 702/117
See application file for complete search history.

(56) References Cited

U.S. PATENT DOCUMENTS

| | | | |
|---|---|---|---|
| 6,567,934 B1 | 5/2003 | Yen et al. | |
| 7,188,041 B1 | 3/2007 | Secatch | |
| 7,409,619 B2 | 8/2008 | El Far et al. | |
| 8,095,331 B2* | 1/2012 | Haufe et al. | 702/117 |
| 8,640,064 B1* | 1/2014 | Liddell et al. | 716/106 |
| 2001/0041972 A1* | 11/2001 | Dearth et al. | 703/14 |
| 2003/0101391 A1* | 5/2003 | Man et al. | 714/718 |
| 2005/0229170 A1* | 10/2005 | Bellantoni et al. | 717/165 |
| 2008/0120085 A1* | 5/2008 | Alexanian et al. | 703/14 |
| 2010/0287415 A1 | 11/2010 | Melis | |
| 2011/0041106 A1* | 2/2011 | Li et al. | 716/106 |

OTHER PUBLICATIONS

Assaf, Mansour, et al., "Promising Complex ASIC Design Verification Methodology," IEEE Instrumentation and Measurement Technology Conference (May 2007).
Badelt, Uwe, et al., "sciPROVE: C++ Based Verification Environment for IP and SoC Design," Forum on Specification & Design Languages 2003 Conference, pp. 617-627 (Sep. 2003).
Smith. Edward, "Designing Reusable Test Automation," Paper, Mangosoft Inc. (Aug. 20, 2001).

* cited by examiner

*Primary Examiner* — Kandasamy Thangavelu
(74) *Attorney, Agent, or Firm* — Steven L. Bennett; Jack V. Musgrove

(57) ABSTRACT

In the verification of an electronic design such as a microprocessor, a set of generic transaction types is applied to a unit in a unit simulation environment and then the same set of generic transaction types is applied to the unit in a larger (e.g., element) simulation environment using an abstraction layer which can interface with both a unit translation layer of the unit simulation environment and an element translation layer of the element simulation environment. The abstraction layer may comprise a generic driver interface which issues generic commands having command parameters including a command type, an address, and operand data. The invention can be extended to multiple units which make up the element, or to multiple elements in the element environment. The invention can further be extended in a hierarchical fashion to other levels of simulation environments, e.g., unit-element-system.

14 Claims, 5 Drawing Sheets

ENABLING REUSE OF UNIT-SPECIFIC SIMULATION IRRITATION IN MULTIPLE ENVIRONMENTS

BACKGROUND OF THE INVENTION

1. Field of the Invention

The present invention generally relates to microprocessors and computer systems, and more particularly to a method of verifying the design of a microprocessor or computer system at different hierarchical levels (simulation environments).

2. Description of the Related Art

Integrated circuits are used for a wide variety of electronic applications, from simple devices such as wristwatches, to the most complicated microprocessors. High-performance computer systems typically use multiple microprocessors to carry out the various program instructions embodied in computer programs such as software applications and operating systems. In a state-of-the-art computer system, these microprocessors interface with an ever-growing collection of equally complicated circuits such as memory devices, input/output (I/O) devices, accelerators, controllers and adaptors.

It is important to ensure that a computer system (or subsystem) design is going to work properly before proceeding with fabrication preparation for the integrated circuit devices, and their assembly into the finished system. A variety of tests can be performed to evaluate the design, but simulation remains the dominant strategy for functionally verifying high-end computer systems. A design-under-test is driven by vectors of inputs, and states encountered while walking through the sequence are checked for properties of correctness. This process is often performed by software simulation tools using different programming languages created for electronic design automation, including Verilog, VHDL and TDML.

Verification of a microprocessor or computer system can involve creating many small "unit" environments which are stitched together to create larger environments. The smaller environments require software drivers to generate traffic into hardware interfaces which would normally be driven by neighboring unit hardware. In larger environments, those drivers are replaced with real hardware, and new drivers are then created which stimulate the larger environment interfaces, and stimulate all of the many units contained in that environment. One example of this simulation environment progression is illustrated in FIGS. 1A and 1B. FIG. 1A shows a generalized unit environment 2 for a microprocessor or system component referred to as Unit A. The simulation environment uses a driver 4 adapted to the particular function of Unit A which is used to stimulate (irritate) the simulated Unit A 6 as represented in a hardware description language such as VHDL. In FIG. 1B, the simulation environment has progressed to an element environment 8 having three simulated units, including the same Unit A VHDL 6, and two other units, Unit B VHDL 14, and Unit C VHDL 16. An element driver 10 is adapted to the particular function of the subject element, and stimulates all three unit models 6, 12 and 14.

SUMMARY OF THE INVENTION

The present invention is directed to a method of verifying a design for an electronic device such as a microprocessor having at least one functional unit, by receiving a set of generic transaction types having associated parameters to stimulate the functional unit, applying the set of generic transaction types to the functional unit in a unit simulation environment using an abstraction layer to interface with a unit translation layer of the unit simulation environment, and then applying the set of generic transaction types to the functional unit in an element simulation environment which is larger than the unit simulation environment using the abstraction layer to interface with an element translation layer of the element simulation environment. In the illustrative embodiment the abstraction layer comprises a generic driver interface which issues generic commands having command parameters including a command type, an address, and oper- and data. The unit translation layer can map the generic transaction types into unit-specific command types and transmit the unit-specific command types to a unit port driver which places the unit-specific command types on a unit hardware interface of the unit simulation environment, and the second translation layer can map the generic transaction types into element-specific command types and transmit the element-specific command types to an element port driver which places the element-specific command types on an element hardware interface of element simulation environment. The invention can be extended to multiple units which make up the element, or to multiple elements in the element environment. The invention can further be extended in a hierarchical fashion to other levels of simulation environments, e.g., unit-element-system. In a specific implementation, the functional unit is a peripheral component interconnect controller, and the element is a processor core.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1A:
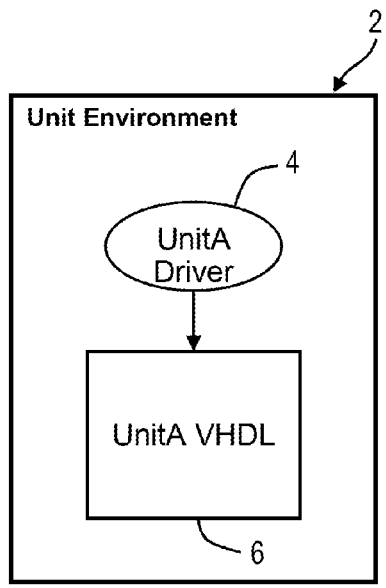
FIGS. 1A and 1B are pictorial representations of progressive simulation environments (unit and element) used in conventional microprocessor verification.
Figure 1B:
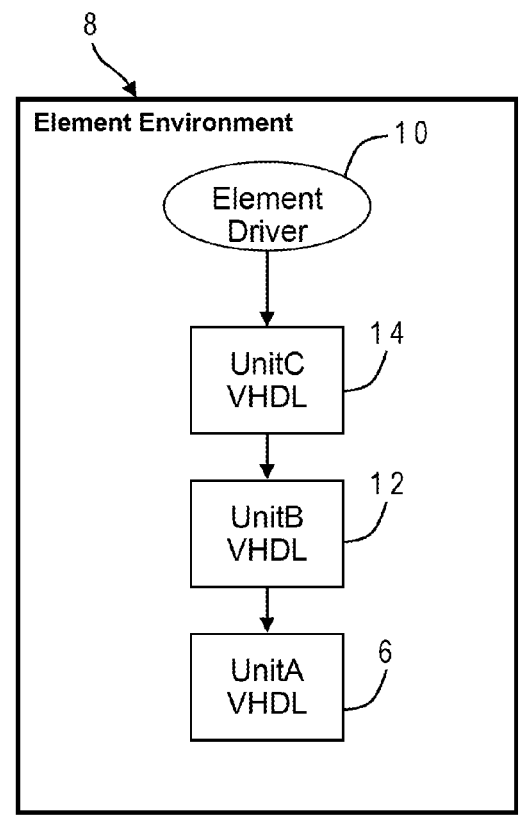

The conventional approach to verification using progressive simulation environments as exemplified in FIGS. 1A and 1B has its benefits, but it still suffers certain drawbacks and inefficiencies. The simulation drivers such as Unit A driver 4 and element driver 10 are generally partitioned into two parts, command generator code and port driver code. The command generator code has nearly all of the intelligence of the driver, and chooses command types, parameter values, command sequences, etc. The port driver code is "dumb" code that takes a command as an input and places it physically on the hardware interface. The primary problem with creating drivers to stimulate units in different environments is the loss of intricate unit knowledge. Drivers in the higher-level (element) environments are implemented by different verification engineers who are further removed from the lower-level (unit) environments. The owner of the element driver accordingly is not aware of the intricacies or extreme (corner) cases within a unit. Corner case coverage development that went into the unit driver is thrown away, and must be re-implemented at higher levels of simulation. Any specialized driver sequences that are functionally required for the unit must be relearned. This drawback is exacerbated as the simulation progresses through multiple levels of higher environments (e.g., element, chip, then system). Each of these intermediate environments requires a new set of drivers to stimulate the model. Even if the higher-level drivers can realize the same corner case coverage, there is a great deal of duplicate coding effort. Resource constraints can make this difficult to achieve on a timely schedule.

In light of the foregoing, it would be desirable to devise an improved method of multiple-environment verification which could retain the benefits of the previous (lower-level) development efforts. It would be further advantageous if the method could actually reuse specific sequences of commands created for lower-level environments, in the higher-level environment simulation. The present invention achieves these advantages by creating an abstraction layer such that the intelligence in a driver can be decoupled from the physical command encodings and sequences that exist on the real hardware interface. Unit drivers can now generate a generic set of transaction types and parameters to be driven. Lower-level driver translation code can convert these generic commands into physical transaction types and parameters on the hardware interface. This approach allows the intelligent part of a unit driver to be transplanted into a higher-level driver, which can convert these generic commands into the proper physical operations as defined by the hardware interface being driven.

Figure 2:
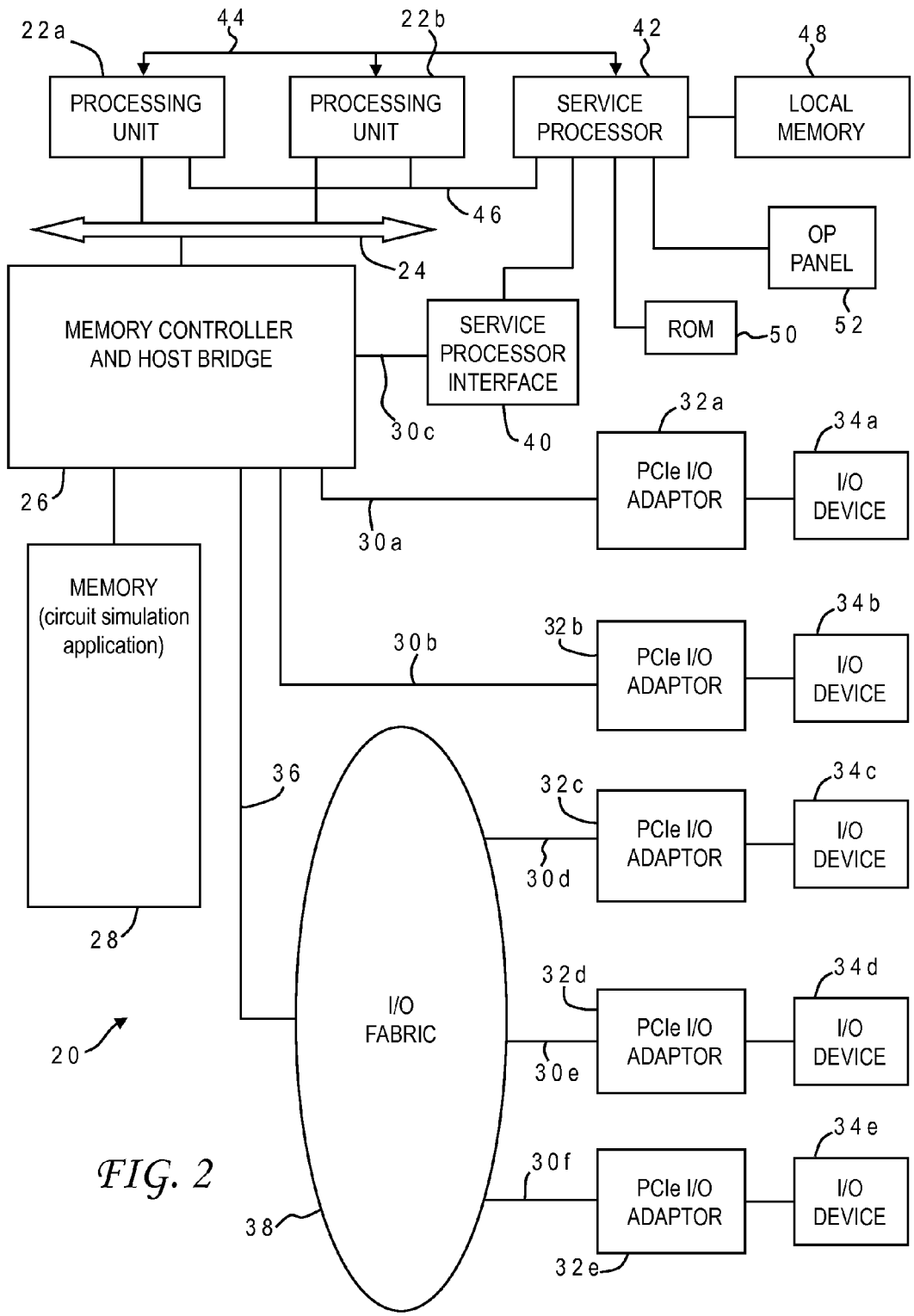
FIG. 2 is a block diagram of a computer system programmed to carry out microprocessor verification in accordance with one implementation of the present invention.

With reference now to the figures, and in particular with reference to FIG. 2, there is depicted one embodiment 20 of a computer system in which the present invention may be implemented to carry out the verification of electronic devices such as microprocessors. Computer system 20 is a symmetric multiprocessor (SMP) system having a plurality of processors 22a, 22b connected to a system bus 24. System bus 24 is further connected to a combined memory controller/host bridge (MC/HB) 26 which provides an interface to system memory 28. System memory 28 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 26 also has an interface to peripheral component interconnect (PCI) Express links 30a, 30b, 30c. Each PCI Express (PCIe) link 30a, 30b is connected to a respective PCIe adaptor 32a, 32b, and each PCIe adaptor 32a, 32b is connected to a respective input/output (I/O) device 34a, 34b. MC/HB 16 may additionally have an interface to an I/O bus 36 which is connected to a switch (I/O fabric) 38. Switch 38 provides a fan-out for the I/O bus to a plurality of PCI links 30d, 30e, 30f. These PCI links are connected to more PCIe adaptors 32c, 32d, 32e which in turn support more I/O devices 34c, 34d, 34e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 26 provides a low latency path through which processors 22a, 22b may access PCI devices mapped anywhere within bus memory or I/O address spaces. MC/HB 26 further provides a high bandwidth path to allow the PCI devices to access memory 28. Switch 38 may provide peer-to-peer communications between different endpoints and this data traffic does not need to be forwarded to MC/HB 26 if it does not involve cache-coherent memory transfers. Switch 38 is shown as a separate logical component but it could be integrated into MC/HB 26.

In this embodiment, PCI link 30c connects MC/HB 16 to a service processor interface 40 to allow communications between I/O device 34a and a service processor 42. Service processor 42 is connected to processors 22a, 22b via a JTAG interface 44, and uses an attention line 46 which interrupts the operation of processors 22a, 22b. Service processor 42 may have its own local memory 48, and is connected to read-only memory (ROM) 50 which stores various program instructions for system startup. Service processor 42 may also have access to a hardware operator panel 52 to provide system status and diagnostic information.

In alternative embodiments computer system 20 may include modifications of these hardware components or their interconnections, or additional components, so the depicted example should not be construed as implying any architectural limitations with respect to the present invention. The invention may further be implemented in an equivalent cloud computing network.

When computer system 20 is initially powered up, service processor 42 uses JTAG interface 44 to interrogate the system (host) processors 22a, 22b and MC/HB 26. After completing the interrogation, service processor 42 acquires an inventory and topology for computer system 20. Service processor 42 then executes various tests such as built-in-self-tests (BISTs), basic assurance tests (BATs), and memory tests on the components of computer system 20. Any error information for failures detected during the testing is reported by service processor 42 to operator panel 52. If a valid configuration of system resources is still possible after taking out any components found to be faulty during the testing then computer system 20 is allowed to proceed. Executable code is loaded into memory 28 and service processor 42 releases host processors 22a, 22b for execution of the program code, e.g., an operating system (OS) which is used to launch applications and in particular the design verification application of the present invention, results of which may be stored in a hard disk drive of the system (an I/O device 34). While host processors 22a, 22b are executing program code, service processor 42 may enter a mode of monitoring and reporting any operating parameters or errors, such as the cooling fan speed and operation, thermal sensors, power supply regulators, and recoverable and non-recoverable errors reported by any of processors 22a, 22b, memory 28, and MC/HB 26. Service processor 42 may take further action based on the type of errors or defined thresholds.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, written for a variety of platforms such as an AIX environment or operating systems such as Windows 7 or Linux. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such storage media excludes transitory media such as propagating signals.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 20 carries out program instructions for functional verification of a microprocessor or computer system (or subsystem) that uses novel abstraction layers to manage component stimulation. Accordingly, a program embodying the invention may include conventional aspects of various verification tools, and these details will become apparent to those skilled in the art upon reference to this disclosure.

Figure 3A:
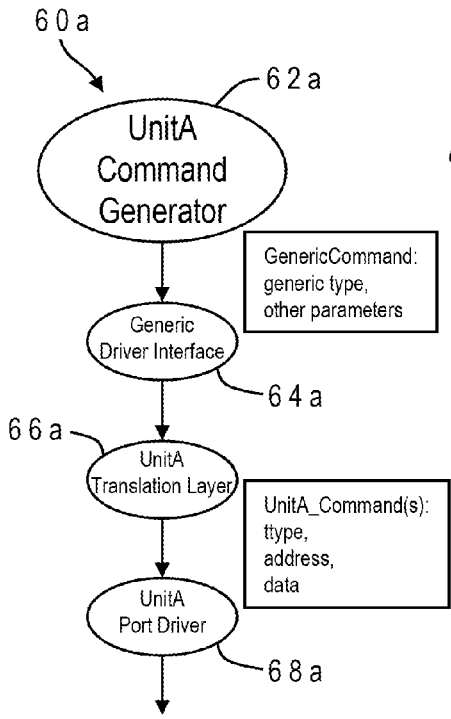
FIGS. 3A-3C are pictorial representations of unit drivers for three different units (A, B and C) having separate command generators adapted for use with a generic driver interface in accordance with one implementation of the present invention.
Figure 3B:
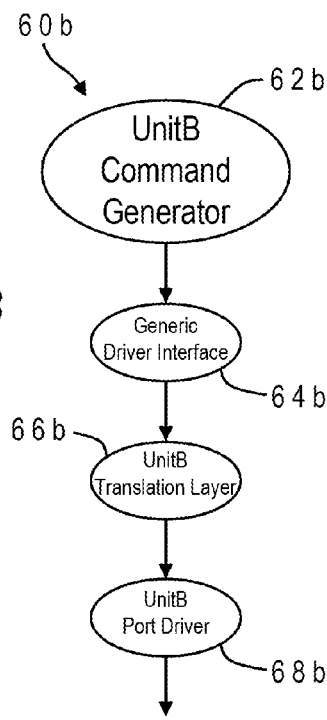
Figure 3C:
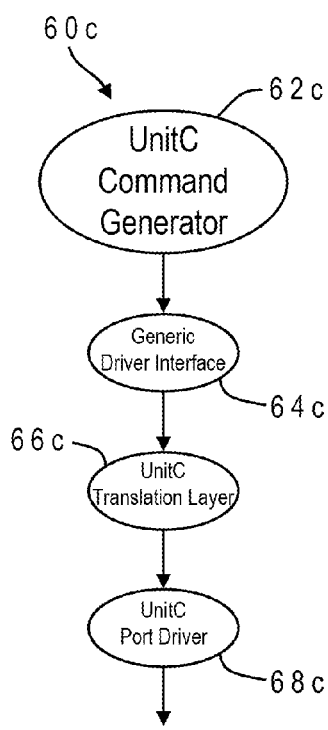

Referring now to FIGS. 3A-3C, there are depicted three different unit drivers 60a, 60b, 60c for respective simulated Units A, B and C. In FIG. 3A, a command generator 62a is adapted to provide a command sequence according to the particular function of Unit A. Command generator 62a contains the intelligence of the unit-level driver, and represents the largest development effort in creating unit driver 60a. Command generator 62a feeds generic commands to a generic driver interface 64a using a generic set of command types and parameters. Generic driver interface 64a sends these generic command types to a unit translation layer 66a which maps them into interface-specific command types according to the particular function of Unit A. For example, the unit command parameters might include a command type, an address, and data. The interface-specific (unit-specific) command types are then transmitted to a unit port driver 68a which places the commands on the hardware interface for the simulated Unit A. Unit translation layer 66a and port driver 68a represent a relatively small development effort in creating unit driver 60a, especially in comparison with the effort required for creating command generator 62a.

Similarly, FIG. 3B illustrates a command generator 62b adapted to provide a command sequence according to the particular function of Unit B, and FIG. 3C illustrates a command generator 62c adapted to provide a command sequence according to the particular function of Unit C. In this manner, each unit owns the intelligence which goes into generating the commands, choosing parameter values, etc., for that unit. Unit B command generator 62b outputs its commands to a generic driver interface 64b, and Unit C command generator 62c outputs its commands to a generic driver interface 64c. Generic driver interface 64b sends generic commands to a unit translation layer 66b which passes on the unit-specific commands to Unit B port driver 68b, and generic driver interface 64c sends generic commands to a unit translation layer 66c which passes on the unit-specific commands to Unit C port driver 68c.

The generic driver interfaces 64a, 64b, 64c (abstraction layers) are not necessarily different. Different units can use the same generic driver interface so long as the parameters of the command from the command generators 62a, 62b, 62c are set up such that the destination for the command can be specified. For example, an address parameter of the command is sufficient to ensure that the command will be routed through other units to the correct destination. For other situations, additional or alternative parameters might be required to utilize a single generic driver interface.

Figure 4:
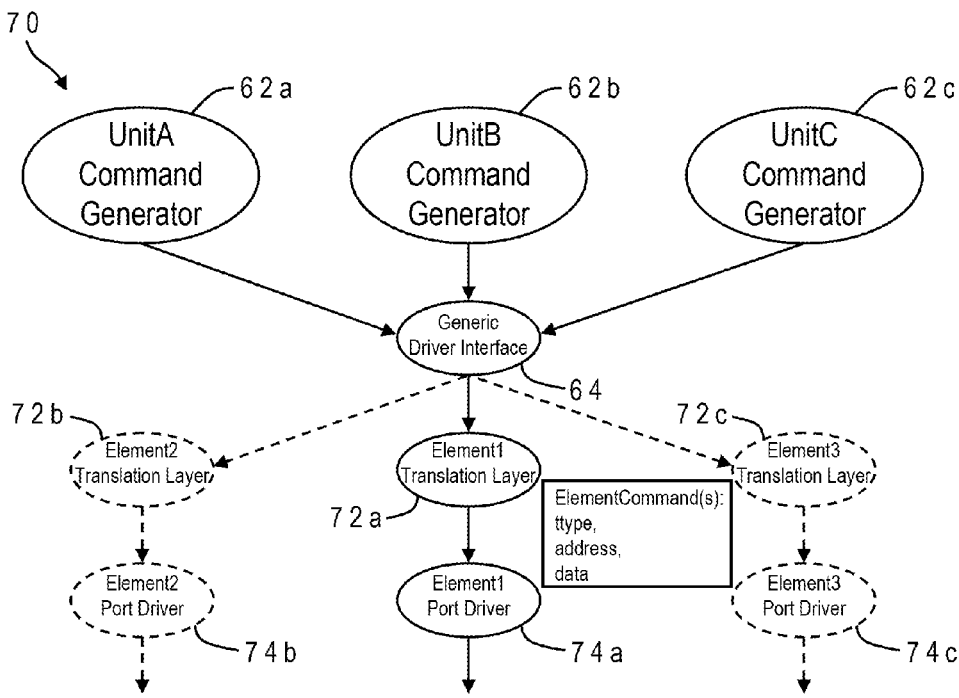
FIG. 4 is a pictorial representation of an element driver which utilizes the unit command generators and generic driver interface of FIGS. 3A-3C in accordance with one implementation of the present invention.

FIG. 4 shows how the intelligence of the unit-level drivers can be plugged into other (higher-level) simulation environments. An element driver 70 is adapted for an element simulation environment which includes Units A, B and C. Element driver 70 accordingly has each of the command generators from FIGS. 3A-3C, that is, Unit A command generator 62a, Unit B command generator 62b, and Unit C command generator 62c. The same command sequences used for the unit-level environments can now be sent from each of these command generators to generic driver interface 64 within the element simulation environment. Thus, the unit-specific simulation irritation is reused at the element level, without any duplicative effort, and preserving corner case coverage. Those skilled in the art will appreciate that this reuse feature of the present invention can be implemented in multiple environments, i.e., additional hierarchical levels (e.g., element/chip/system). Generic driver interface 64 sends the generic commands to an element (Element 1) translation layer 72a which maps them into interface-specific command types according to the particular function of the element. For example, the element command parameters might include a command type, an address, and data. The interface-specific (element-specific) command types are then transmitted to an element (Element 1) port driver 74a which places the commands on the hardware interface for the simulated element.

Embodiments of the present invention allow for the presence of multiple elements in the element simulation environment, with corresponding translation layers and port drivers. FIG. 4 illustrates how generic driver interface 64 can have pointers to two other element translation layers, an Element 2 translation layer 72b, and an Element 3 translation layer 72c. Element 2 translation layer 72b has a pointer to an Element 2 port driver 74b, and Element 3 translation layer 72c has a pointer to an Element 3 port driver 74c.

The present invention has application to a wide variety of circuit or system components (units, elements, etc.). In order to better understand operation of the invention, it is useful to relate the foregoing description to the following specific implementation, but this example should not be construed in a limiting sense. In a microprocessor design, there are various hardware registers which are addressable by software. For example, a register in the peripheral component interconnect (PCI) controller has a configured address, such that the register can be read/written by normal load/store operations to that address by the processor core. One such register might be used as part of an interrupt procedure. When the PCI controller issues an interrupt to the processor, the core can communicate back to the PCI controller that it has accepted the interrupt by issuing a store operation to write a value of "1" to the address of the PCI register. When the core has finished processing the interrupt, the core can issue a write of value "2" to the address of the PCI register. The PCI hardware, when it detects the interrupt has been handled, can then write the register back to "0" (software can optionally poll that register to verify that PCI has detected the interrupt completion). This example is only one of many such procedures which require very specific sequences of operations which read and write values in registers throughout the storage subsystem.

Applying this example to the foregoing disclosure for FIGS. 3A-3C and 4, the PCI controller may be modeled as Unit A, Unit B might be the coherency interconnect between storage units, and Unit C might be the L2 cache which is responsible for executing reads/writes from the core. The element driver represents the processor core. In this manner, the unit-level command generator created to test the PCI controller can be re-implemented in a different driver of the larger element environment. The physical parameters of each hardware interface (PCI/unit, core/element) are different, but there are generic concepts which are preserved on both interfaces, so methods according to the present disclosure can be used to save some work.

Figure 5:
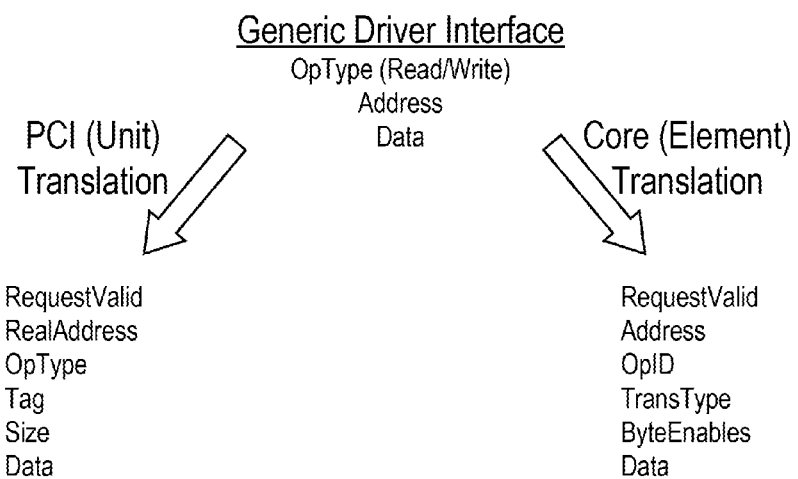
FIG. 5 is a chart illustrating an exemplary application of a generic driver interface in accordance with one implementation of the present invention to translate commands for a PCI unit and for a core element.

FIG. 5 depicts how a generic command may be translated for different hardware interfaces using the previous example involving communications between a PCI controller and a processor core. Since in this example there are reads and writes to the PCI registers which require specific driver work, the designer can create a generic interface to represent those operations. Rather than having a PCI driver connect directly into an interface for the coherency bus to PCI controller, it instead communicates directly with the generic driver interface (a "GenericInterface" class). The generic driver interface will receive a generic command having three parameters: an operation type (0=Read, 1=Write); the address to be read or written to; and data to be written (for a write operation). This command is passed to the appropriate translation layer.

In a PCI-only (unit) environment, the PCI-specific driver will translate the generic command parameters into the appropriate values for the coherency bus interface. Those unit-specific parameters might for example include: a "RequestValid" flag which is pulsed to indicate a request is being issued (valid in cycle 0); a real address, i.e., the physical address being requested (valid in cycle 0); an operation type (1=register read, 2=register write, 3=I/O read, 4=I/O write, etc., valid in cycle 2); a tag or numeric identifier for this request (valid in cycle 3); size (how many bytes are being read/written); and write data, if the request is a write operation (first 8 bytes valid in cycle 4, second 8 bytes valid in cycle 5). The coherency bus/PCI interface (Unit A driver 60a) stimulates those signals at the desired times to mimic software executing in the core which is handling interrupts as described above.

Still referring to FIG. 5, in the core (element) environment, the core-specific driver will translate the generic command parameters the appropriate values for the core/L2 interface. Those element-specific parameters might for example include: a "RequestValid" flag which is pulsed to indicate a request is being issued (valid in cycle 0); a numeric operation identifier for this request (valid in cycle 0); a transaction type (1=sync, 7=load, 8=store, etc., valid in cycle 2); the physical address being requested (valid in cycle 4); a 32-bit byte enable field, with each bit causing associated data to be written to storage (valid in cycle 5); and store data, if the request is a store (32 bytes, valid in cycle 5). The core driver (element driver 70) again stimulates those signals as desired for testing.

Further to this example, multiple element translation layers and port drivers may be provided representing multiple processor cores of the element environment. When the generic driver interface receives a generic command, it can resolve the destination core by augmenting the command with the additional parameters which may for example include a core assignment (0=choose any random driver, 1=send to a specific driver), and the selected core identifier (numeric), if the core assignment=1, which identifies which physical core to send the command from. The generic driver interface will issue the command to the corresponding element translation layer as indicated by those parameters.

The present invention may employ specific sequences of commands with very specialized parameters depending on the particular application. One example is testing systems which include accelerators. The control software for an accelerator will create an accelerator-specific control block in system memory. The accelerator reads all the needed inputs from the accelerator-specific control block and performs the requested operations. Some of the fields in the accelerator control block might for example include the requested operation, source address, destination address and operation specific inputs such as key value and key size for encryption/decryption. In testing such systems, store operations can be used to establish unit-specific control blocks in memory. The command sequence for an accelerator may also include a special instruction known as icswx in the PowerPC instruction set. The icswx instruction is used to send data to a coprocessor (accelerator). When the icswx instruction is executed, the L2 cache generates a coprocessor-request transaction on the system bus. The coprocessor compares the logical partition ID and processor ID included in the transaction with the logical partition ID and processor ID held in the window context to determine if the process is authorized to generate the transaction. The present invention allows the icswx instruction to target a pre-established control block for a particular accelerator instance.

Another example of a special command sequence is for units with interrupt capability. The driver can coordinate its interrupts with scheduled memory-mapped I/O read and write operations at specific times to emulate true software actions.

Figure 6:
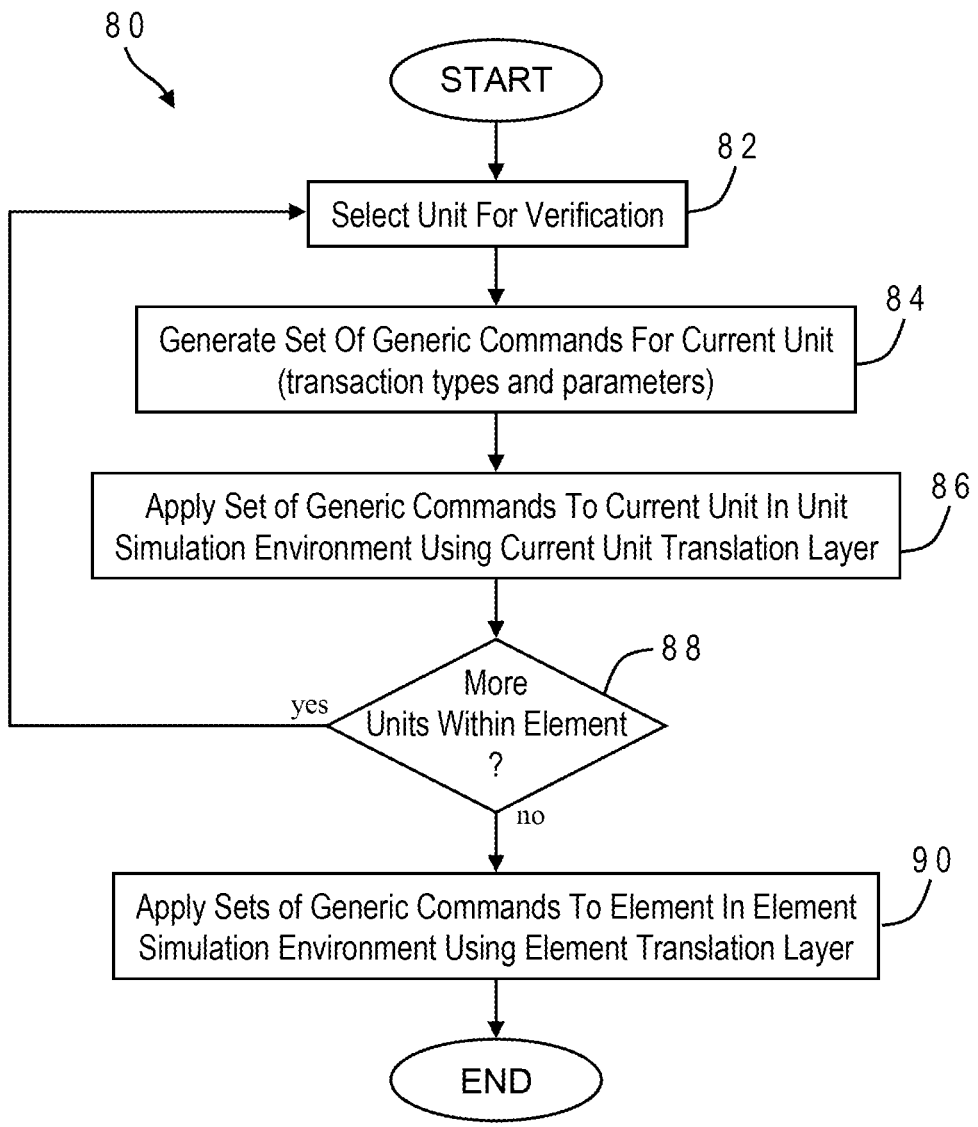
FIG. 6 is a chart illustrating the logical flow of a verification process using progressive simulation environments in accordance with one implementation of the present invention.

The present invention may be further understood with reference to the chart of FIG. 6 which illustrates a verification process 80 in accordance with one implementation. The process begins by selecting a unit for verification at the unit-level environment (82). A set of generic commands is generated for the current unit (84). This set of generic commands is then applied to the current unit in the unit simulation environment, using the unit translation layer (86). This process is repeated for each unit within an element (88). Once the units have all been tested in their respective unit environments the same sets of generic commands are applied to the element in the element simulation environment using the element translation layer (90), whereupon the process is complete. The invention thereby allows the deep knowledge of the unit verification team to be easily applied at higher levels of simulation.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention has been described in the context of microprocessor verification, but it is more generally applicable to testing of an electronic circuit or device. It is therefore contemplated that such modifications can be made without departing from the spirit or scope of the present invention as defined in the appended claims.

What is claimed is:

1. A computer system comprising:
one or more processors which process program instructions;
a memory device connected to said one or more processors; and
program instructions residing in said memory device for verifying a design for an electronic device having at least one functional unit by receiving a set of generic transaction types having associated parameters to stimulate the functional unit, applying the set of generic transaction types to the functional unit in a first simulation environment using an abstraction layer to interface with a first translation layer of the first simulation environment, and applying the set of generic transaction types to the functional unit in a second simulation environment which is larger than the first simulation environment using the abstraction layer to interface with a second translation layer of the second simulation environment, the second translation layer being different from the first translation layer.

2. The computer system of claim 1 wherein the abstraction layer comprises a generic driver interface which issues generic commands having command parameters including a command type, an address, and operand data.

3. The computer system of claim 1 wherein:
the first translation layer maps the generic transaction types into first interface-specific command types and transmits the first interface-specific command types to a first port driver which places the first interface-specific command types on a first hardware interface of the first simulation environment; and
the second translation layer maps the generic transaction types into second interface-specific command types and transmits the second interface-specific command types to a second port driver which places the second interface-specific command types on a second hardware interface of second simulation environment.

4. The computer system of claim 1 wherein:
the functional unit is a first functional unit and the set of generic transaction types is a first set of generic transaction types; and
said program instructions further receive a second set of generic transaction types having associated parameters to stimulate a second functional unit, apply the second set of generic transaction types to the second functional unit in a third simulation environment using the abstraction layer to interface with a third translation layer of the third simulation environment, and apply the second set of generic transaction types to the second functional unit in the second simulation environment using the abstraction layer to interface with the second translation layer of the second simulation environment.

5. The computer system of claim 1 wherein the applying of the set of generic transaction types in the second simulation environment further uses the abstraction layer to interface with a third translation layer of the second simulation environment, the third translation layer being different from the first translation layer and the second translation layer.

6. The computer system of claim 1 wherein said program instructions further apply the set of generic transaction types to the functional unit in a third simulation environment which is larger than and includes the second simulation environment using the abstraction layer to interface with a third translation layer of the third simulation environment, the third translation layer being different from the first translation layer and the second translation layer.

7. The computer system of claim 1 wherein the functional unit is a peripheral component interconnect controller, the first simulation environment is a peripheral component interconnect unit simulation environment, and the second simulation environment is a processor core simulation environment.

8. A computer program product comprising:
a computer-readable storage medium; and
program instructions residing in said storage medium for verifying a design for an electronic device having at least one functional unit by receiving a set of generic transaction types having associated parameters to stimulate the functional unit, applying the set of generic transaction types to the functional unit in a first simulation environment using an abstraction layer to interface with a first translation layer of the first simulation environment, and applying the set of generic transaction types to the functional unit in a second simulation environment which is larger than the first simulation environment using the abstraction layer to interface with a second translation layer of the second simulation environment, the second translation layer being different from the first translation layer.

9. The computer program product of claim 8 wherein the abstraction layer comprises a generic driver interface which issues generic commands having command parameters including a command type, an address, and operand data.

10. The computer program product of claim 8 wherein
the first translation layer maps the generic transaction types into first interface-specific command types and transmits the first interface-specific command types to a first port driver which places the first interface-specific command types on a first hardware interface of the first simulation environment; and
the second translation layer maps the generic transaction types into second interface-specific command types and transmits the second interface-specific command types to a second port driver which places the second interface-specific command types on a second hardware interface of second simulation environment.

11. The computer program product of claim 8 wherein:
the functional unit is a first functional unit and the set of generic transaction types is a first set of generic transaction types; and
said program instructions further receive a second set of generic transaction types having associated parameters to stimulate a second functional unit, apply the second set of generic transaction types to the second functional unit in a third simulation environment using the abstraction layer to interface with a third translation layer of the third simulation environment, and apply the second set of generic transaction types to the second functional unit in the second simulation environment using the abstraction layer to interface with the second translation layer of the second simulation environment.

12. The computer program product of claim 8 wherein the applying of the set of generic transaction types in the second simulation environment further uses the abstraction layer to interface with a third translation layer of the second simulation environment, the third translation layer being different from the first translation layer and the second translation layer.

13. The computer program product of claim 8 wherein said program instructions further apply the set of generic transaction types to the functional unit in a third simulation environment which is larger than and includes the second simulation environment using the abstraction layer to interface with a third translation layer of the third simulation environment, the third translation layer being different from the first translation layer and the second translation layer.

14. The computer program product of claim 8 wherein the functional unit is a peripheral component interconnect controller, the first simulation environment is a peripheral component interconnect unit simulation environment, and the second simulation environment is a processor core simulation environment.

\* \* \* \* \*